United States Patent [19]

Nielsen et al.

[11] 4,165,033
[45] Aug. 21, 1979

[54] IDENTIFICATION SYSTEM

[75] Inventors: Holger Nielsen, Allerød; Per Salling, Birkerød, both of Denmark

[73] Assignee: A/S N. Foss Electric, Hillerod, Denmark

[21] Appl. No.: 899,994

[22] Filed: Apr. 25, 1979

[30] Foreign Application Priority Data

Apr. 26, 1977 [DK] Denmark .............................. 1820/77

[51] Int. Cl.² .......................... G06K 7/00; G06K 7/08; G06K 19/06; G01S 9/56
[52] U.S. Cl. .................................... 235/439; 235/449; 235/490; 343/6.8 R
[58] Field of Search ............... 235/419, 439, 451, 487, 235/490, 449, 450, 435; 365/52; 343/6.5 R, 6.8 R; 40/300, 301, 302, 303, 304; 84/1.04, 1.28

[56] References Cited

U.S. PATENT DOCUMENTS

| 3,185,964 | 4/1962 | Margiloff | 235/451 |
| 3,299,424 | 1/1967 | Vinding | 235/439 |
| 3,377,618 | 4/1968 | Dersch | 235/439 |
| 3,521,280 | 7/1970 | Janco et al. | 235/439 |
| 3,816,708 | 6/1974 | Walton | 235/439 |
| 3,842,246 | 10/1974 | Kohler | 235/439 |
| 4,058,707 | 11/1977 | Giolitti et al. | 235/448 |

Primary Examiner—Daryl W. Cook
Attorney, Agent, or Firm—Dennison, Dennison, Meserole & Pollack

[57] ABSTRACT

An identification system comprising a plurality of differently frequency coded markings including mechanical vibrating means, and a detector device for detecting the frequency or combination of frequencies of the vibrating means. The vibrating means of the various markings are preferably made from identical comb-like members having teeth which are vibratory with different natural frequencies and of the type used in small music boxes. The different frequency codes may then be obtained by removing teeth in different combinations from the members used in the various markings. The markings may, for example, be arranged on dairy cattle, and the identification system may then be used in connection with a milk sampling system.

20 Claims, 3 Drawing Figures

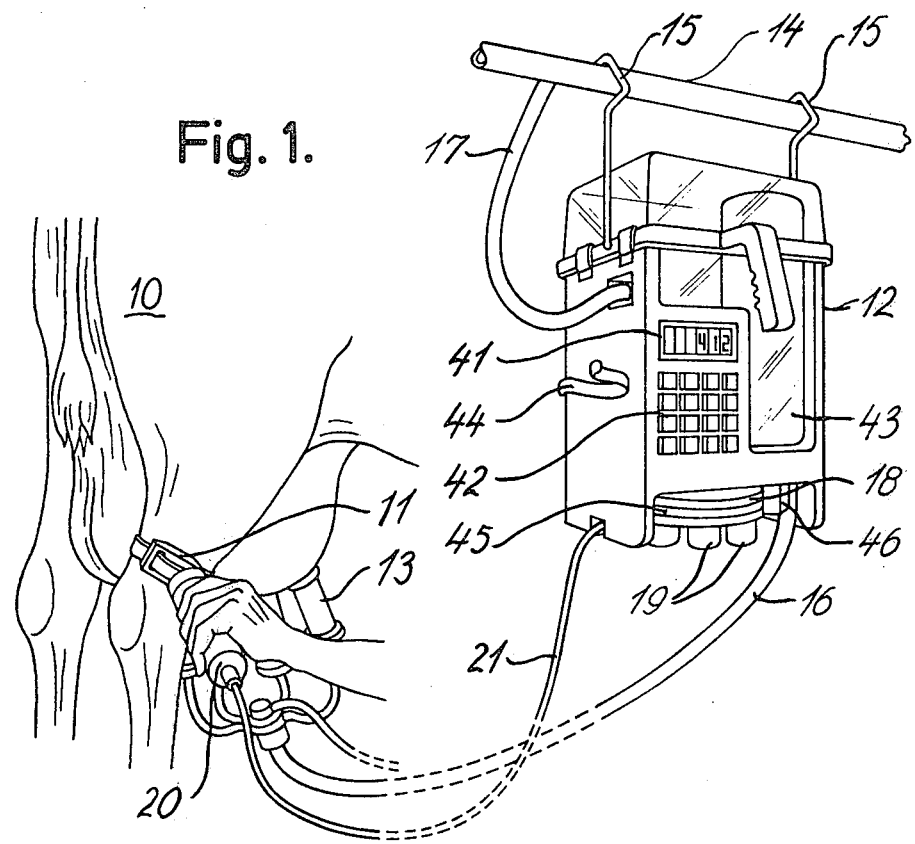
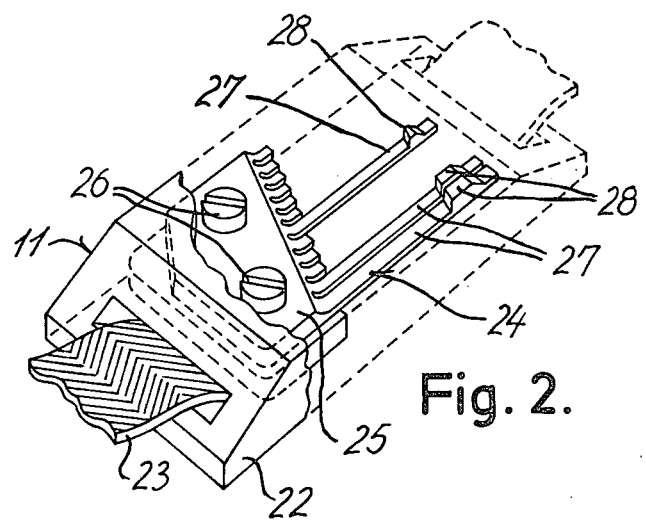

IDENTIFICATION SYSTEM

BACKGROUND OF THE INVENTION

1. Field of the Invention.

The present invention relates to an identifcation system comprising a plurality of differently coded individual markings and a detector device for detecting the codes of said markings.

2. Description of the Prior Art.

Identification systems of that type are known for example from U.S. Pat. No. 3,842,246 and German "Auslegeschrift" No. 1,905,008. In these known systems the markings include electronic circuits having predetermined resonant frequencies, and a detector device for activating these circuits and detecting the resonant frequencies thereof.

SUMMARY OF THE INVENTION

The present invention provides an identification system in which very simple, inexpensive, and sturdy markings may be used. Thus, the present invention provides an identification system comprising a plurality of differently coded individual markings and a detector device for detecting the codes of said markings, each of said markings including mechanical vibrating means and said detector device including means for detecting the frequencies of said mechanical vibrating means.

The frequency combinations of the mechanical vibration means may be detected by using any suitable detecting principle. Thus, it would be possible to detect the vibrations of the mechanical vibrating means by a detector functioning in principle as a microphone. Such detection principle would, however, quite often give rise to disturbances due to background noise. Therefore, preferably means are provided for generating a magnetic field, said vibrating means containing a ferromagnetic material and said detector device comprising means for detecting changes in said magnetic field. The changes of the magnetic field will then include a frequency combination similar to that of the mechanical vibrating means being detected. The said magnetic field may be generated in any suitable manner, for example by means of a permanent magnet or an electromagnet, and that magnet may be arranged either in connection with the detector device or in connection with each single coded marking. It is preferred, however, to include the magnetic field generating means in the detector device, and these means may comprise an electromagnet connected to an electric current source.

The changes in the magnetic field caused by the mechanical vibrating means may be detected by an induction coil which may be arranged adjacent to the magnetic field generating means in a unit which may be positioned close to the marking to be detected, and the current signals from the induction coil may then be supplied to a frequency analyzer the output of which may in turn be supplied to a suitable data processing circuitry and to registration means.

The markings used in the identification system according to the invention preferably do not contain energy sources. Therefore, the mechanical vibrating means must be activated before the frequency code thereof may be detected by the detector device. Activation of the vibrating means may, for example, be made by an external mechanical action, for example by an impact. When the vibrating means contain ferro-magnetic material they are, however, preferably activated by a sudden magnetic force which may be generated by discharging a capacitor through the windings of the electromagnet generating the magnetic field mentioned above.

The mechanical vibrating means preferably comprise one or more vibratory fingers or strips fixed at one end. In the preferred embodiment of the system according to the invention the vibrating means in all of the markings are made from identical comb-like members of the type used in small music boxes. Such comb-like members have a plurality of vibratory teeth having different natural frequencies, and the different codes of the markings included in the identification system may then be provided by removing teeth in different combinations from the various identical members. In this manner it is possible to produce a great number of relatively inexpensive differently coded markings.

The identification system according to the invention may be used for marking and identifying objects of any type. Due to the sturdiness and inexpensiveness of the markings including the mechanical vibrating means the system according to the invention is suited for use in marking and identifying animals. In a preferred embodiment the markings are used for marking dairy cattle, and the detector device is associated with a milk sampling device so as to identify the source of a milk sample taken.

According to a further aspect the invention relates to a marking for use in the identification system described above, said marking comprising one or more vibratable fingers or strips fixed at one end.

BRIEF DESCRIPTION OF THE DRAWING

The invention will now be further described with reference to the drawings, wherein FIG. 1 is a perspective view of a milk sampling system including an embodiment of the identification system according to the invention, FIG. 2 is a perspective view in an enlarged scale of a marking or identification tag used in the identification system, certain walls having been cut away.

DESCRIPTION OF THE PREFERRED EMBODIMENT

Figure 3:
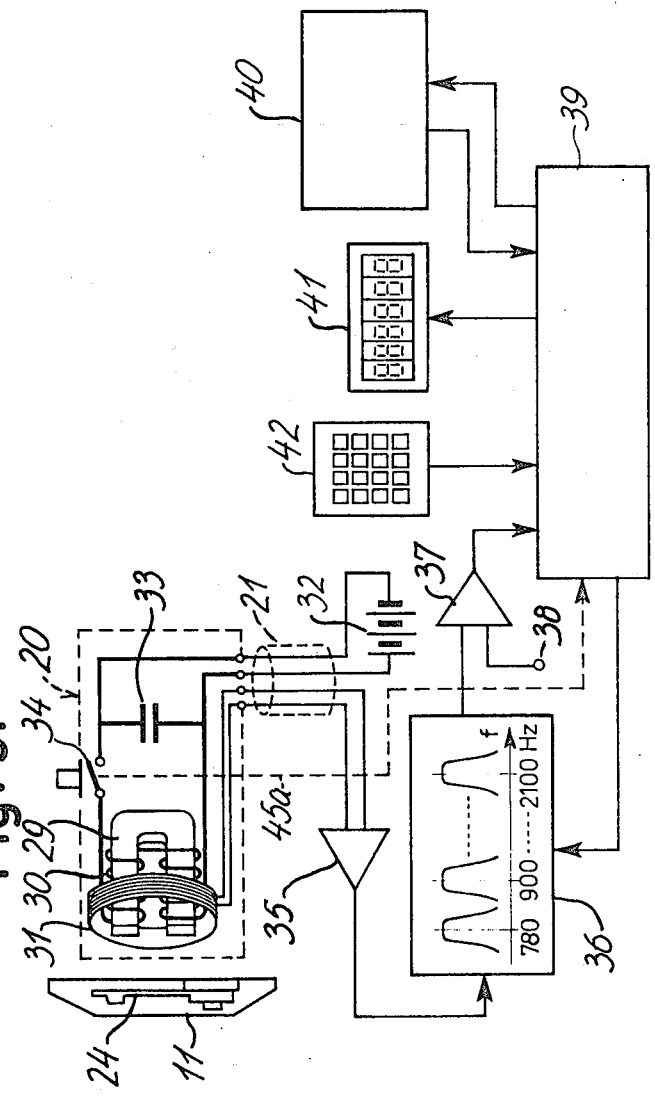
FIG. 3 is a block diagram of the identification system.

FIG. 1 shows a cow 10 having a marking or an identification tag 11 mounted on one hind leg. The cow is being milked and a milk sampling unit generally designated by 12 is positioned in the milk stream between teat-cups 13 and a milk line 14. The sampling unit 12 is suspended on the milk line 14 by means of hook members 15 and connected to the teat-cups 13 by means of a hose 16 and to the milk line 14 by means of a hose 17. The sampling unit 12 contains a cassette 18 containing a plurality of sample cups 19. During milking of the cow 10 the sampling unit 12 automatically takes out a representative sample of the milk flowing therethrough and measures the yield of the cow on the basis thereof. The milk sample is collected in one of the cups 19 of the cassette 18. The cup 19 in which the sample is collected must be provided with some kind of information identifying the cow from which the sample originates. This information is provided by means of the identification system according to the invention comprising a detector or sensor 20 which, as shown in FIG. 1, may be gripped manually and positioned close to the identification tag 11 including an identification code which may thereby be sensed or detected as described more in detail in the following. The detector 20 is connected to a processing circuitry in the unit 12 by means of a cable 21.

The cows of a herd must, of course, be provided with identification tags 11 which are differently coded. The preferred embodiment of the marking or tag is shown in FIG. 2. This marking comprises a housing 22 provided with a mounting belt 23 and containing a comb-like member 24 of the type used in small music boxes and having a base plate 25 which is fixed to the housing 22 by means of screws 26 or other fastening means, and a plurality of teeth 27 having different natural frequencies. Each of the teeth 27 is provided with a nose 28 adjacent to its free end, and manufacturer of the members 24 may adjust the frequencies of the teeth 27 to the predetermined values by removing small amounts of material from the noses 28, for example by grinding. In the embodiment shown in FIG. 2 the comb-like member 24 originally contained twelve teeth of different natural frequencies, for example 780, 900, 1020, 1140, 1260, 1380, 1500, 1620, 1740, 1860, 1980, 2100 Hertz (cycles per second), but nine teeth have been broken off so that the member 24 shown in FIG. 2 has only three teeth and consequently defines a frequency combination code of 780, 900, and 1380 Hertz. It should be understood, that the comb-like members in identification tags mounted on other cows in the herd have different combinations of teeth which remain on and teeth which are removed therefrom. At least the teeth 27 of the member 24 consist of or contain a ferro-magnetic material and is preferably made from steel. The housing 22 is made from a non-ferro-magnetic material such as plastic, and protect the member 24 from moisture and dirt and from physical damage.

As shown in FIG. 3 the detector 20 includes a horse shoe magnet 29 having windings 30, and an induction coil 31 surrounding one end of the magnet 29. The windings 30 are connected to battery 32 or another electricity source which is preferably arranged within the sampling unit 12. A capacitor 33 is connected in parallel with the windings 29 and the battery 32, and a manually operated switching device 34 which preferably includes a semi-conductor rectifier is arranged in the connection between the windings 30 and the capacitor 33.

The induction coil 31 is connected to the inputs of an AGC-amplifier 35 the input of which is supplied to a frequency analyzer 36. The output of the frequency analyzer is connected to an input of a comparator 37 having its other input connected to a reference voltage terminal 38. The output of the comparator is connected to a controller and memory device 39 which is in turn connected to a yield measurement and milk sampling calculator 40 and to a digital display 41. A keyboard 42 is also connected to the controller and memory device 39.

During milking of the cow 10 milk is flowing from the teat-cups 13 through the hose 16 to the milk sampling unit 12 where a representative sample is taken out by a sampler 43 and collected in one of the sample cups 19 of the cassette 18. The sampling unit 12 also contains the yield measuring and milk sampling calculator 40 (FIG. 3) for calculating i.a. the yield of the cow on the basis of the volume of the sample collected in the cup 19. The sampler 43 and the associated calculator 40 do not form part of the present invention and will therefore not be described in detail.

When not in use the detector or sensor 20 is held by a holder 44 positioned on the sampling unit 12 and the switching device 34 is then in its open or "off" position whereby the capacitor 33 is being charged by the battery 32. During milking the operator releases the detector 20 from the holder 44 and positions the free end thereof close to (within a distance of approximately 2 cm from) the identification tag 11 as illustrated in FIGS. 1 and 3. The operator now depresses the push button of the switching device 34 to close the same whereby the windings 30 of the magnet 29 are connected to the battery 32 and to the capacitor 33. Thus, closing of the switching device 34 causes creation of a current peak in the windings 29 due to discharge of the capacitor 33, followed by a uniform current supply at a substantially lower level from the battery 32. The current peak or current pulse caused by discharge of the capacitor 33 generates a strong magnetic field of a very short duration which actuates the teeth 27 within the housing 22 of the identification tag 11 so that these teeth are caused to vibrate at their natural frequencies. The vibrating teeth 27 cause changes in the magnetic field with the same frequencies, and these changes are detected by the induction coil 31. The terminals of the coil 31 are connected to the AGC (Automatic Gain Control) amplifier 35 the output of which is supplied to the frequency analyzer 36 including a band-pass filter for each of the natural frequencies of the twelve possible teeth 27 of the comb-like member 24 as indicated in FIG. 3. The output signal of the frequency analyzer 36 is passed to the comparator 37, and the output signal of the comparator 37 constituting the result of the code reading operation is in turn supplied to and stored by the memory device 39.

Depression of the push button of the switching device 34 supplies a first signal or starting signal to the controller and memory device 39 as indicated by a broken line 45a in FIG. 3, and when the milking of the cow 10 has been completed the operator depresses a push button of the keyboard 42 whereby a second signal or stop signal is supplied to the device 39. On the basis of these two signals the operation of the frequency analyzer 36 and the calculator 40 is controlled and timed by the device 39. When the push button of the keyboard 42 has been depressed by the operator the code reading stored in the memory (i.e. the cow number) and the result of the yield calculation made by the calculator 40 are registered on a magnetic strip or medium 45 positioned on the cassette 18 (FIG. 1) by means of a suitable magnetic printing or registering device 46 forming part of the device 40. The code detected by the detector 20 is preferably, but not necessarily, visually displayed by the digital display 41. As explained above, the normal operator (the farmer or his assistant) is expected to use only one of the keyboard push buttons. The other push buttons of the keyboard 42 may be used by a specially trained field inspector. By means of the keyboard push buttons and the display 41 the field inspector may communicate with the system and register static data, such as date and farm number.

Although the invention has been described above with special reference to milking operations it is to be understood that the identification system and the markings according to the invention may be used for marking and identification of objects or animals other than cows. Even though comb-like members 24 of the music box type as that shown in FIG. 2 may advantageously be used as mechanical vibrating means in the markings according to the invention, it should be understood that any other type of mechanical vibrating means could be used.

We claim:

1. An identification system comprising a plurality of differently coded individual markings and a detector device for detecting the codes of said markings, each of said markings including mechanical vibrating means, and said detector device including means for detecting the frequencies of said mechanical vibrating means.

2. An identification system according to claim 1, further comprising means for generating a magnetic field, said vibrating means containing a ferro-magnetic material and said detector device comprising means for detecting changes in said magnetic field.

3. An identification system according to claim 2, wherein the detector device comprises said magnetic field generating means which include an electromagnet and an electricity source connected thereto.

4. An identification system according to claim 2 wherein said change detecting means comprise an induction coil arranged adjacent to said magnetic field generating means.

5. An identification system according to claim 4, wherein said change detecting means further comprise a frequency analyzer.

6. An identification system according to claim 2, wherein said detector device further comprises means for activating said mechanical vibrating means.

7. An identification system according to claim 3, further comprising a capacitor connected in parallel with said electricity source and windings of said electromagnet, and a manually controllable switch for controlling the connection between said capacitor and said windings of the electromagnet.

8. An identification system according to claim 1, wherein said vibrating means comprise at least one vibratable finger fixed at its one end.

9. An identification system according to claim 8, wherein said vibrating means in all of said plurality of markings have been made from identical comb-like members with vibratable teeth having different natural frequencies, different combinations of teeth having been removed from the comb-like members in said differently coded markings.

10. An identification system according to claim 9, wherein said markings are adapted to be fastened to dairy cattle and said detector device being associated with a milk sampling device so as to identify the source of a milk sample taken.

11. An identification system according to claim 10, wherein said detector device is connected to a recording device for recording the marking code detected on a recording medium positioned on a milk sample container.

12. An identification system according to claim 11, wherein said recording device is a magnetic recording device and said medium is a magnetic medium.

13. A marking for use in an identification system according to claim 1, and comprising at least one vibratable figer fixed at its one end.

14. A marking according to claim 13, wherein said vibratable finger is a tooth of a comb-like member having a plurality of teeth.

15. A marking according to claim 14, wherein at least one of the teeth of said comb-like member has been removed.

16. A cow identification system comprising a plurality of differently frequency coded identification tags adapted to be fastened to cows, a frequency detecting device associated with a milk sampling device for detecting and registering the frequency codes of said tags, and means for generating a magnetic field at a tag being detected, each identification tag including at least one mechanical vibrating member having a certain natural frequency, and including ferro-magnetic material, and said detecting device including means for detecting vibrating changes in said magnetic field caused by said mechanical vibrating member.

17. A cow identification system according to claim 16, wherein said detecting device comprises said magnetic field generating means which include an electromagnet and an electricity source connected thereto.

18. A cow identification system according to claim 17, wherein said detecting device further comprises means for activating said mechanical vibrating member.

19. A cow identification system according to claim 18, wherein said activating means comprise a capacitor connected in parallel with said electricity source and windings of said electromagnet, a manually controllable switch being provided for controlling the connection between said capacitor and said winding of the electromagnet.

20. A cow identification system according to claim 19, wherein said mechanical vibrating member is a tooth of a comb-like member having a plurality of vibratable teeth of which some have been removed.

* * * * *